US006529900B1

(12) United States Patent
Patterson et al.

(10) Patent No.: US 6,529,900 B1
(45) Date of Patent: Mar. 4, 2003

(54) METHOD AND APPARATUS FOR DATA VISUALIZATION

(75) Inventors: John F. Patterson, Carlisle, MA (US); Steven L. Rohall, Winchester, MA (US); Arjuna Wijeyekoon, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/483,631

(22) Filed: Jan. 14, 2000

Related U.S. Application Data

(60) Provisional application No. 60/116,181, filed on Jan. 14, 1999.

(51) Int. Cl.$^7$ .............................................. G06F 17/30
(52) U.S. Cl. .................. 707/3; 707/4; 707/5; 707/102; 707/503; 345/765; 345/781
(58) Field of Search ........................... 707/3, 104.1, 4, 707/102, 5, 503; 345/709, 745, 349, 440, 619, 764, 781, 765, 833, 784, 973, 974

(56) References Cited

U.S. PATENT DOCUMENTS

| | | | | |
|---|---|---|---|---|
| 5,414,809 A | * | 5/1995 | Hogan et al. | 345/765 |
| 5,581,677 A | | 12/1996 | Myers et al. | 345/440 |
| 5,841,437 A | | 11/1998 | Fishkin et al. | 345/619 |
| 5,850,531 A | * | 12/1998 | Cox et al. | 345/781 |
| 6,023,280 A | | 1/2000 | Becker et al. | 345/440 |
| 6,188,403 B1 | | 2/2001 | Sacerdoti et al. | 345/764 |
| 6,282,547 B1 | | 8/2001 | Hirsch | 707/102 |

OTHER PUBLICATIONS

Aiken, A. et al., "Tioga–2: a direct manipulation database visualization environment" in "Data Engineering, 1996", Feb. 26–Mar. 1, 1996, IEEE Catalog No.: 96CB35888, pp.: 208–217.*

Shneiderman, B., "Dynamic queries, starfield displays and the path to Spotfire," http://www.cs.umd.edu/hcil/spotfire/ (Feb. 4, 1999; downloaded Nov. 30, 1999)/.

"Show Business Cuber 2.0—Overview", http://www.show-business.com/sh . . . /a (downloaded Nov. 30, 1999).

"Show Business Cuber 2.0—Competition Overview," http://www.showbusiness.com/showbus/cube (downloaded Dec. 22, 1999).

"Show Business Cuber 2.0—Data Sheet," http://www.show-business.com/showbus/cube (downloaded Dec. 29, 1999).

Mizuno, H. et al., "Data Queries using Data Visualization Techniques," *Proc. of 12th International Conference on Sysetm, Man, and Cybernetics*, Oct. 1997, vol. 3, pp. 2392–2396.

Tenev, T. and R. Rao, "Managing Multiple Focal Levels in Table Lens," *Proc. of the IEEE Symposium on Information Visualization*, Oct. 1997, pp. 59–63, 122.

Stonebraker, M. et al., "Tioga, A Database–Oriented Visualization Tool," IEEE 1993 (p. 86–93).

* cited by examiner

*Primary Examiner*—Kim Vu
*Assistant Examiner*—Gwen Liang
(74) *Attorney, Agent, or Firm*—Hamilton, Brook, Smith & Reynolds, P.C.

(57) ABSTRACT

A method and system are provided for visualization of information stored in database records. Data visualizations offer a view of the underlying database records and are created and stored with in the database along with the database records. A data visualization includes data visualization points that are associated with underlying database records. Each data visualization point provides a direct drill-down capability, allowing for the full record display of the underlying database record associated with the a visualization point. Specific user interface mechanisms are provided with the data visualizations to allow a user to navigate among the database records as well as to manipulate the data stored in the underlying database records. Data manipulation may occur as a result of direct user interaction with the visualization points or through a specific user interface designed to allow data modification.

12 Claims, 8 Drawing Sheets

|  | 302 | 304 | 306 | 308 |
|---|---|---|---|---|
|  | Event | Date | Location | Type |
|  | Beginning Year | 1950 | NA | Endpoint |
|  | Kennedy Shot | 1963 | Dallas, TX | Political |
|  | Johnson Elected | 1964 | Washington, DC | Political |
|  | Pulsars Discovered | 1968 | Cambridge, MA | Scientific |
|  | MLK Assasination | 1968 | Somerville, MA | Political |
|  | Apollo 8 Orbit | 1968 | KSC, FL | Scientific |
|  | Czech Invasion | 1968 | Europe | Cultural |
|  | Nixon Reelected | 1972 | Washington, DC | Political |
|  | Nixon Resigns | 1974 | Washington, DC | Political |
|  | Carter Elected | 1976 | Washington, DC | Political |
|  | Ending Year | 2000 | NA | Endpoint |

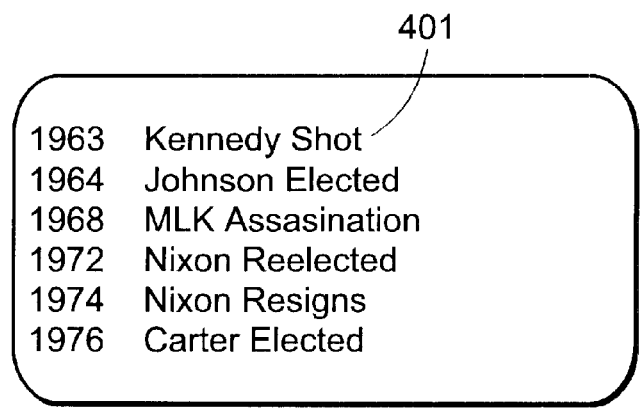

FIG. 4

METHOD AND APPARATUS FOR DATA VISUALIZATION

RELATED APPLICATION(S)

This application claims the benefit of U.S. Provisional Application No. 60/116,181, filed Jan. 14, 1999, the entire teachings of which are incorporated herein by reference.

BACKGROUND OF THE INVENTION

This invention relates generally to the display and storage of data in a database system, and more particularly to data visualization mechanisms for the display and updating of data in a database system.

Data visualization is a technique that allows a user of a database system to view information about data stored in the database along different dimensions. The data visualizations that are created to display the information can take on various forms. One typical form is that of a table layout, with each row representing a record in the database and each column representing a field from the record. The table usually lists a subset of the database records and a subset of the available fields in the database records. The table can be ordered as an aid to navigation.

There exist systems that provide data visualizations (or views) of database records. Existing views are often restricted to list or table-like structures with possible sorting, categorization or outlining features. Other systems use non-list type structures, but are restricted to views based upon intermediary data gathered from the database, not the actual database records themselves. The Cuber™ product from Show Business Software Ltd., 137–139 Euston Road, London NW1 2AA creates charts and graphs based on intermediate database information.

Providing creative data visualization mechanisms, integrated into database systems, with views based upon access to underlying database records has proven to be a difficult problem.

SUMMARY OF THE INVENTION

Existing systems do not allow for the storage of data visualizations within the database while providing access to underlying database records.

The present invention provides an effective technique for integrated data visualization by creating and rendering visualization points representing the database records. The visualization points are associated with particular underlying database records. A navigational interface for processing user interaction with the visualization points provides direct access to the underlying database records. The direct access allows for the display of information stored in the associated database record. The display of information can also include information generated from the information stored in the database records (e.g., "virtual fields"). Additionally, the direct access allows for the updating of information stored in the associated database record. Updating can take place as the user manipulates the visualization points associated with the database records.

In one embodiment of the present invention the navigational interface presents the visualization points along a number line. The number line can represent a time line, such that database records associated with dates can be visualized. The time line can comprise a first scale representing a full range of dates for the database records, a second scale representing a displayed range of dates for the database records associated with the visualization points, and a slider mechanism for adjusting the ratio of the fill range of dates to the displayed range of dates. In another embodiment, the navigational interface presents the visualization points along an X and Y axis in a two-dimensional blank sheet display. The two-dimensional space is analogous to a blank "whiteboard" that allows a user to position visualization points data anywhere within the two-dimensional space. Annotation of the space with text and/or graphics gives further meaning to groupings of visualization points created on the blank sheet display.

Each visualization point allows for a "drill-down" process. The "drill-down" process provides complete access to the underlying database record associated with the visualization point. The user can display information from all the fields in the underlying database record as well as edit/update information in these fields.

Data visualization (alternate views) provides an effective way in which to organize vast amounts of data stored in databases such that a user can organize related information and retrieve it when needed. Existing visualization mechanisms provide some organizational features, including categorization schemes, but categorization schemes are typically limited to simple hierarchical structures (e.g., Company, Division, Department, Employee). These schemes do not provide the flexibility of the data visualization techniques of the present invention.

The present invention provides data visualization that is integrated with the database (e.g., the visualizations are stored within the database) with the ability to drill-down to a specific underlying database record. Additionally, specific user interface mechanisms (e.g., the time line and the blank sheet display) allow for both effective viewing and manipulation of data stored in the underlying database records.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 is an illustration of a collection of database records in a preferred embodiment of the present invention.

FIG. 4 is an illustration of a list-type visualization on a collection of database records in a preferred embodiment of the present invention.

DETAILED DESCRIPTION OF THE INVENTION

Figure 1:
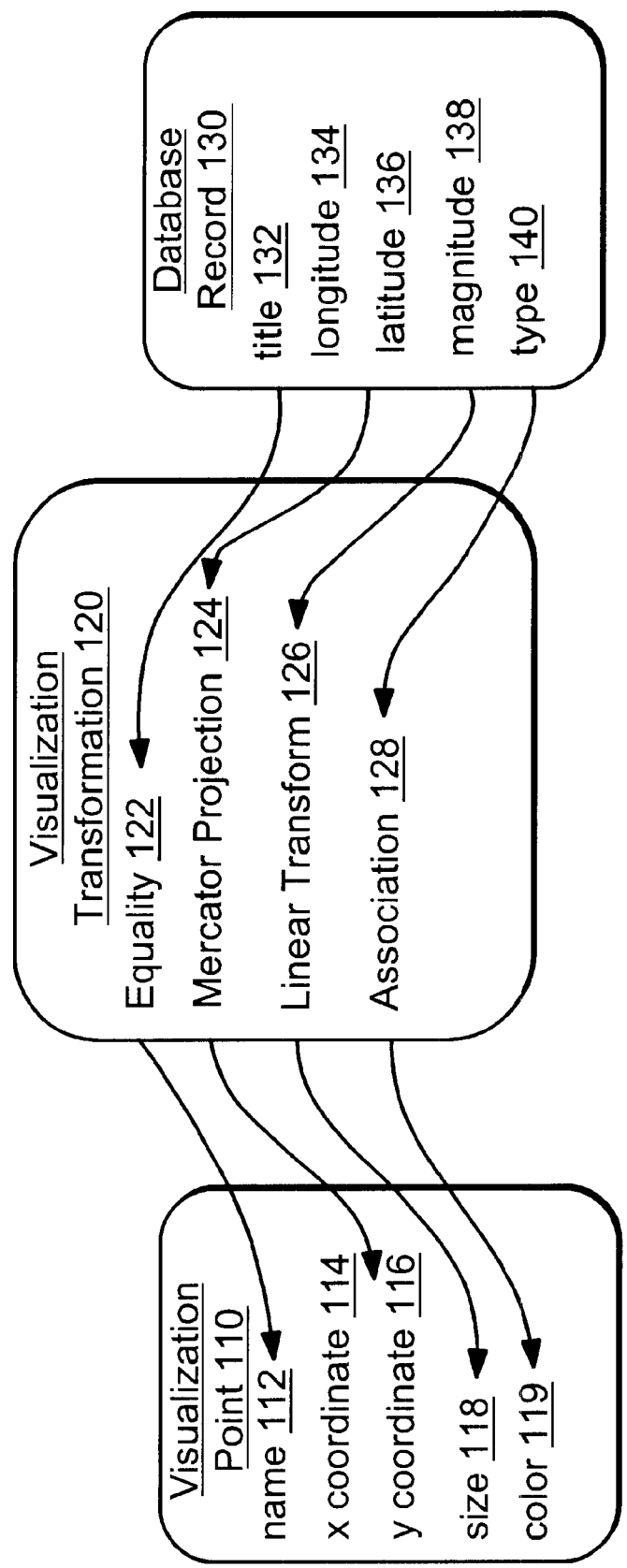
FIG. 1 is an illustration of the mapping of information from an abstract space onto a presentation space.

A description of preferred embodiments of the invention follows.

Data visualizations, or views, display information about several data records at the same time, as opposed to mechanisms that view database records themselves. The data displayed through the data visualization point can be used as an access point to identify the underlying database record as well as a display mechanism itself. Data visualizations can be used to access the underlying database record or document by drilling-down on a specific data visualization point. Many systems that manage database records restrict their visualizations to lists. The lists are often structured as tables in which the rows represent database records and the columns present different attributes (fields) of the database records. Often one field is a unique identifier; other fields may contain ancillary information. Additional refinements on list-type visualizations include: filtering (to create a subset of database records), sorting (to arrange database records in a defined order) and categorizing (to group associated database records together).

Existing list-type visualization mechanisms lack the ability to use spatial layout as a means for presenting database records. Without the present invention, time-based records can not be easily placed on a time line. Similarly, geographic-based database records can not easily be placed on a map. Additionally, in prior art systems it is not easy to present a graphical tree for accessing database records.

The data visualizations of the present invention are designed to be general, allowing for various UI configurations. Their layout is spatial, to communicate relationships among the database records. The data visualizations can also be used as data editors, allowing the user to change an entry in a database record by moving a visualization point in a presentation space. Data visualizations can also contain a navigational component, providing the ability to control a database record filter based on graphic navigation (e.g., panning and zooming).

The purpose of a database visualization is to map the abstract objects (e.g., records within the database) onto the two-dimensional space of a display window. There are three primary elements to the problem of data visualization: the abstract representation of the objects, the concrete presentation of the objects and the mapping between these two. Explicit recognition of the viewing transformation, as a separate element, is an essential aspect of developing general UI components for data visualization.

The records within a database represent points in an abstract multidimensional space. A database visualization is a projection of this abstract space onto a concrete presentation space. Database visualizations can be simple projections (i.e., those projections that are defined by a one-to-one function relating some abstract dimension to either the horizontal or vertical dimension of the display). Any complex projection may be achieved by computing new fields in the database and mapping these onto a simple projection.

Given that the fields of the database will be mapped onto the display dimensions, the present invention categorizes fields according to their utility for achieving this mapping. Some fields like open-ended descriptions and titles are essentially useless for achieving this mapping. These fields are characterized by an almost unrestricted use of text to the point that each record is likely to have a unique entry, thus they offer no opportunity for simplification in the data visualization. Of these dimensions it is useful to distinguish between descriptions (i.e., open-ended text or rich-text blocks), and titles (i.e., short text strings that uniquely identify a record). The descriptions are unlikely to play a large role in the data visualization, while the titles may serve as labels placed at the display location of an item.

The remaining fields are generally either scalar or categorical. The scalar dimensions have a concept of order and measure. Time, geographic coordinates, currency and other numeric dimensions are scalar. Often these can be placed in a direct linear relationship to a display dimension. Categorical dimensions characterize qualities of a record, preferably as a value selected from a small enumerated set. In Lotus Notes® R5, the keyword fields are the clearest example of categorical dimensions, but a text field could serve, if used consistently for a small set of enumerated values. Name fields (e.g., author fields and reader fields) may also serve as categorical dimensions, since they are often selected from a restricted set. A special type of categorical dimension is a hierarchical dimension. Certain information within a database of documents (e.g., categories and responses) are characterized hierarchically. Hierarchical relationships can be coded using a special delimiter, '/', separating a list of text tokens representing entities in the hierarchy. The list of tokens represents a path through a categorization hierarchy.

These three field types (open-ended, scalar and categorical) help define data in the abstract space.

The presentation space is comprised of the dimensions of the display that can be differentially driven by aspects of the database. Horizontal and vertical positioning of visualization points is one aspect of the presentation dimensions, but other dimensions exist to categorize the presentation space.

The most obvious dimensions are the layout dimensions. Although higher dimensionality is feasible, the present invention concentrates on one and two dimensional layouts that align with the window coordinates. These may be separated further into two types: continuous and discrete. For continuous layouts the display area is "infinitely" divisible; a data item can be positioned at a pixel and this is meaningfully different from an item presented at a neighboring pixel. Continuous layouts are most useful for displaying scalar abstract dimensions. Discrete layouts divide the display area into rows or columns. A scalar abstract dimension can be mapped into a discrete layout by defining cuts on the scale that pool close values together. Discrete layouts are, however, most valuable for displaying categorical abstract dimensions.

In addition to the layout dimensions the presentation space includes a visualization point for identifying the data record and visualization point display attributes that can be used to characterize different abstract dimensions. Typically the visualization point will be mapped into a title or other unique identifier of the data object. The visualization point can, however, be a geometric shape, which pops up the unique identifier when selected. The visualization point display attributes are visual properties like the color, brightness, shape or size of the visualization point. Since it is difficult for people to perceive very many gradations in these visual properties, they are most useful for presenting categorical dimensions. Certain dimensions, like brightness and size, may be used to present a small set of ordered cuts on a scalar dimension, but others like shape and color are inappropriate for conveying order information.

To summarize, the presentation space may be separated into the following elements: layout dimensions (continuous, discrete), visualization points (unique, geometric shape), and visualization point attributes (order, categorical).

The viewing transformation is the function that relates the abstract dimensions to the presentation dimensions. If the data visualizations are generic, then the job of a programmer is to establish the relationship between a visualization and a database. In other words, the programmer's job is to define the viewing transformation. The viewing transformation consists of the following five parts: the filter, the prioritization, the visualization point, the visualization point attributes, and the layout.

The filter and prioritization are functions that determine whether a database record will be in the visualization and what priority it will be given. Typically, with a list display type visualization the prioritization function determines the sort order of an item in the list. The sort concept is a priority ordering over all the displayable items. This priority can be used to resolve order within lists, but it can also be used to determine whether an item will be displayed at all for a given level of granularity in the visualization.

The viewing transformation also consists of the visualization point and the visualization point attributes. These can be placed under the control of an abstract dimension. For the visualization point, this is a direct relationship. For the visualization point attributes, the viewing transformation requires a function that maps an abstract dimension into the enumerated levels of a given attribute.

Finally, the layout consists of determining how many dimensions will be displayed, which abstract dimensions will be mapped to the layout, and how the abstract dimensions will be transformed if necessary. Some one and two-dimensional displays can have the following layout types: one-dimensional scalar (e.g., time line), one dimensional categorical (e.g., categorized lists), two-dimensional scalar (e.g., scatter plot, geographic display), two-dimensional categorical (e.g., table) and mixed categorical by scalar (e.g., a stack of time lines).

FIG. 1 is an illustration of the mapping of information from an abstract space (database records 130) onto a presentation space (visualization points 110). This example maps, or transforms, information from a database containing earthquake data onto a geographic display.

The abstract space is defined by the records in the database. The dimensions of this space are fields. The fields in this example contain the name given to the earthquake event (title 132), the location of the earthquake (longitude 134, latitude 136), the severity of the earthquake (magnitude 138) and the type 140 of the earthquake.

The presentation space is defined by visualization points 110, the visualization points 110 combine to form a data visualization or display object. In this example, the title 132, the longitude 134, and latitude 136 of the earthquake are displayed within an X-Y coordinate space as a name 112, whose size 118 and color 119 indicate the earthquake's magnitude 138 and type 140, respectively.

Transformations stand between these two spaces indicating how the dimensions of one space are mapped onto the dimensions of the other. In this example, the displayed earthquake name is a simple copy (equality 122) of the database record title 132. The longitude 134 and latitude 136 of the earthquake are transformed into an X-Y coordinate space using a Mercator projection 124. The Mercator projection 124 is a representation of the earth which displays land masses in their correct shapes but distorts their areas, excluding 90 degrees North and/or 90 degrees South, covering a range of 160 degrees latitude. The magnitude 138 of the earthquake is mapped using a linear transform 126 to display its size 118. The type 140 of the earthquake (extensional, transform, or compressional) is mapped to a color 119 in the presentation space.

Figure 2:
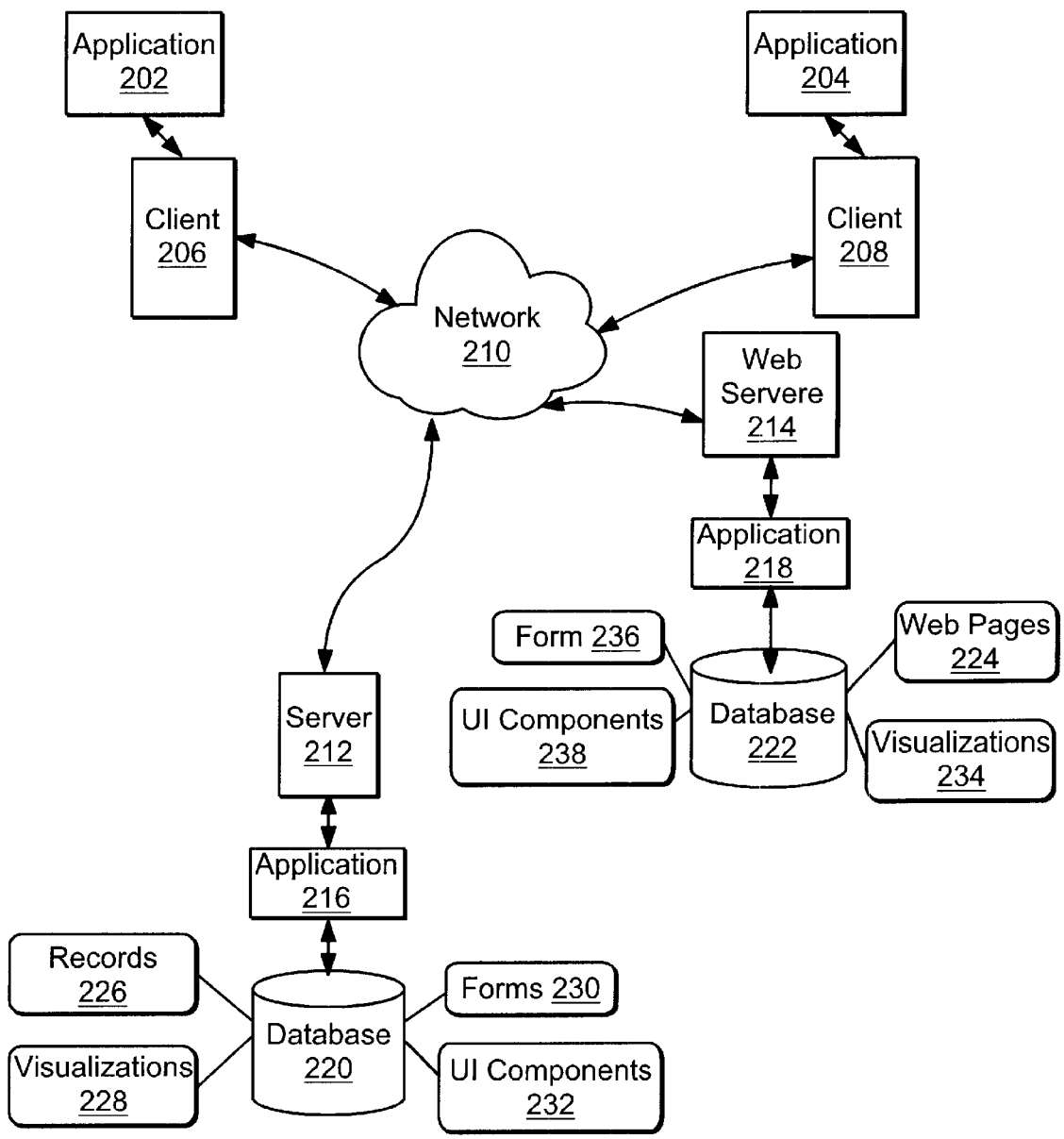
FIG. 2 is a diagram of a computer architecture implementing a preferred embodiment of the present invention.

FIG. 2 is a diagram of a computer architecture implementing a preferred embodiment of the present invention. An application 202, 204 running on client computers 206, 208 is connected to a communications network 210. The application 202, 204 can be a Web Browser (e.g., Netscape Navigator or Microsoft Internet Explorer) or a proprietary client, such as Lotus Notes® R5. The communications network 210 can be a proprietary network, a public network (e.g., Internet) or some combination of both. The communications network 210 connects client computers 206, 208 to server computers 212, 214 and hence client applications 202, 204 to application programs 216, 218 via propagated signals. Server application programs 216, 218 run on the servers 212, 214 and provide access to data stored in connected databases 220, 222. Application programs 216, 218 may be Lotus Domino™ server software or other Internet server software.

A database 220 contains records 226, forms 230, UI components 232 and visualizations 228. Database records 226 store data in fields. Forms 230 define the layout, either storage or presentation, of data stored in the database 220. UI components 232 are stored with the database 220 and provide various controls for interacting with the database records 226. Data visualizations 228 display information about several database records 226 at the same time. Data visualizations 228 can be used to access the underlying database records 226 by drilling-down on a specific data visualization point. Although client applications (202, 204) shown in FIG. 2 are connected through a network 210, they also may be locally connected directly to database 220, 222, so that network 210 is not required.

Database 222 is used to store Web pages 224. Like the database records 226, stored in database 220, the Web pages 224 contain fields and can be used to represent documents. Also like the database records 226, Web pages 224 can be the underlying accessed data upon which data visualizations 234 are based. These Web pages are access via application 218 executing on Web server 214. Forms 236 define the layout, either storage or presentation, of data stored in the database 222. UI components 238 are stored with the database 222 and provide various controls for interacting with the Web pages 224. Data visualizations 234 can display information about multiple Web pages 224 at the same time. Data visualizations 234 provide display and navigation as well as drill-down and editing capabilities on the underlying data in Web pages 224.

FIG. 3 is an illustration of a collection of database records in a preferred embodiment of the present invention. In this example multiple records 300 representing a series of events that occurred between 1950 and 2000 are stored in the database. The event field 302 contains a description of the event. The date field 304 contains the year upon which the event occurred. The location field 306 contains the location where the event took place. The type field 308 categorizes the events. The database records 300 are available to view and display in a variety of formats. Specifically, full record displays and data visualizations are possible on the database records 300.

FIG. 4 is an illustration of a list-type view on a collection of database records in a preferred embodiment of the present invention. A typical list-type database visualization lists a subset of fields, in a subset of records, ordered by one of the fields. In this example, a visualization 400 of the database records 300 is presented. The visualization 400 shows all "political" type events that are represented in the database records 300. In this visualization 400 only the date 304 and event 302 fields are used to identify the underlying database record 300. Selecting a visualization point 401 (e.g., "1963 Kennedy Shot") for drill-down (e.g., by double-clicking on the visualization point 401) produces a full display of the underlying database record 300.

Figure 5:
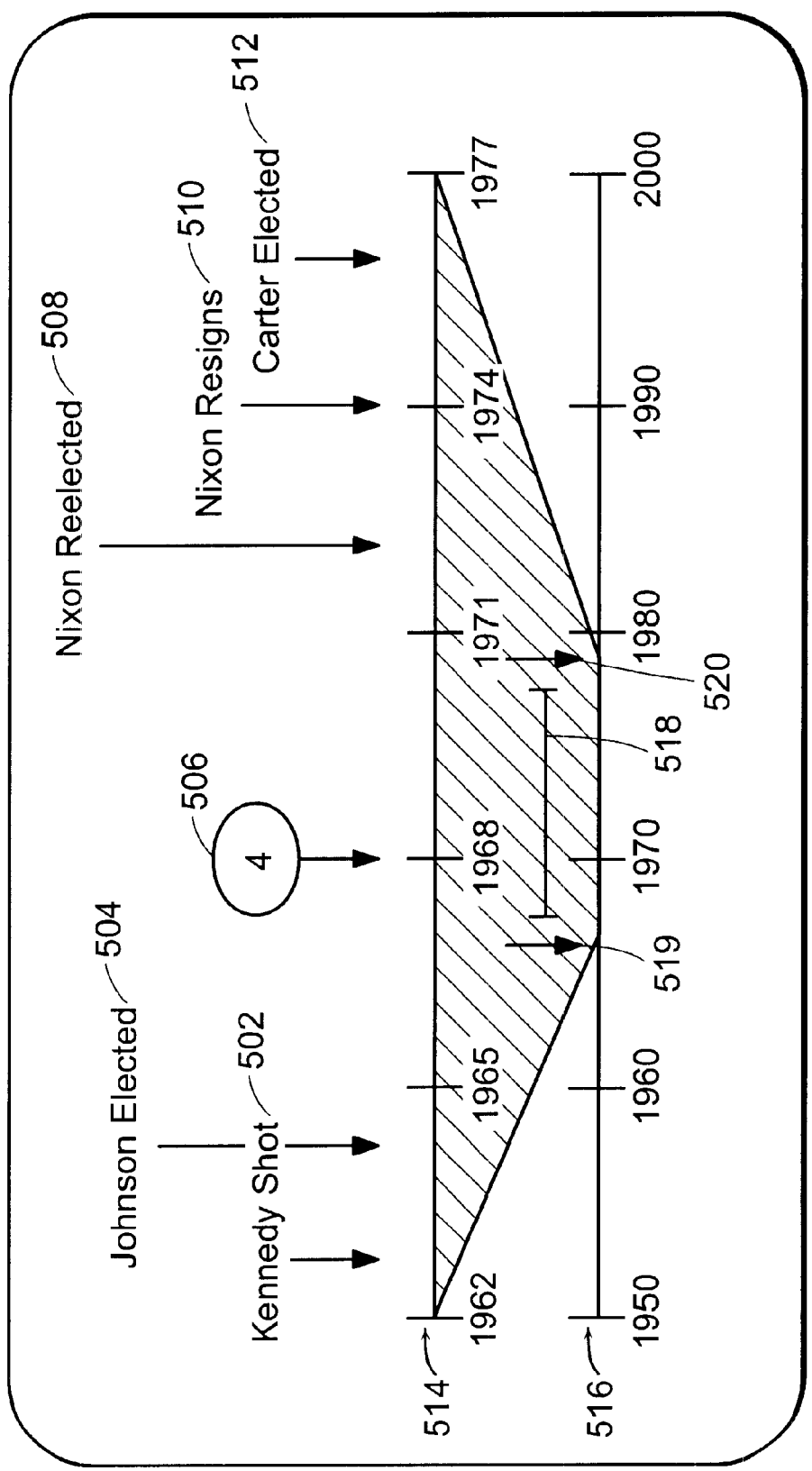
FIG. 5 is an illustration of a time line data visualization on a collection of database records in a preferred embodiment of the present invention.

FIG. 5 is an illustration of a time line data visualization on a collection of database records in a preferred embodiment of the present invention. Data visualizations can have absolute (global) frames of reference, as well as relative (local) frames of reference. Navigational controls can be used to adjust the ratio of relative to absolute frames of reference. Data visualizations contain data visualization points, each associated with a unique database record identifier. These data visualization points may be hierarchical, allowing the display of many database records at a single point. A single click on the left mouse button can produce a list of database records, whereas a double click on the left mouse button can request a full display of a database record. Data visualizations support the operations of: navigation (re-define the visualization), examination (drill-down to display a full database record) and modification (updating data in a database record). Modification of data in the database record can occur by graphical movement of the data visualization point within the presentation space, and by invoking a data-entry form associated with the underlying database record.

FIG. 5 depicts a time line visualization. The absolute frame of reference is the bottom (absolute) scale 516, running from the years 1950 to 2000, it indicates the full range of dates under consideration. The relative frame of reference is the upper (relative) scale 514, running from the years 1962 to 1977, it indicates the portion of the absolute scale that is currently being viewed. The navigation controls 518, 519, 520 are between the two scales 514, 516 and permit a redefinition of the relative scale 514. The data visualization points 502, 504, 506, 508, 510, 512 are text above the relative scale 514, indicating where the events fall on the relative scale 514. When one date has more data visualization points than can be individually displayed, a group visualization point 506 can represent a group of underlying visualization points. A group visualization point 506 is displayed as a number which represents the count of underlying visualization points associated with that date. In the time line visualization, most navigation is a matter of changing the relative scale 514. The two arrows 519, 520 may be dragged horizontally in either direction to expand or contract the relative scale 514. The I-bar 518 may be dragged horizontally in either direction to move the relative frame of reference without changing the granularity of the relative scale 514. When a group visualization point 506 is displayed, a list of the records associated with the group visualization point 506 can be displayed, for example by holding down the left mouse button while it is over the group visualization point 506.

Figure 6:
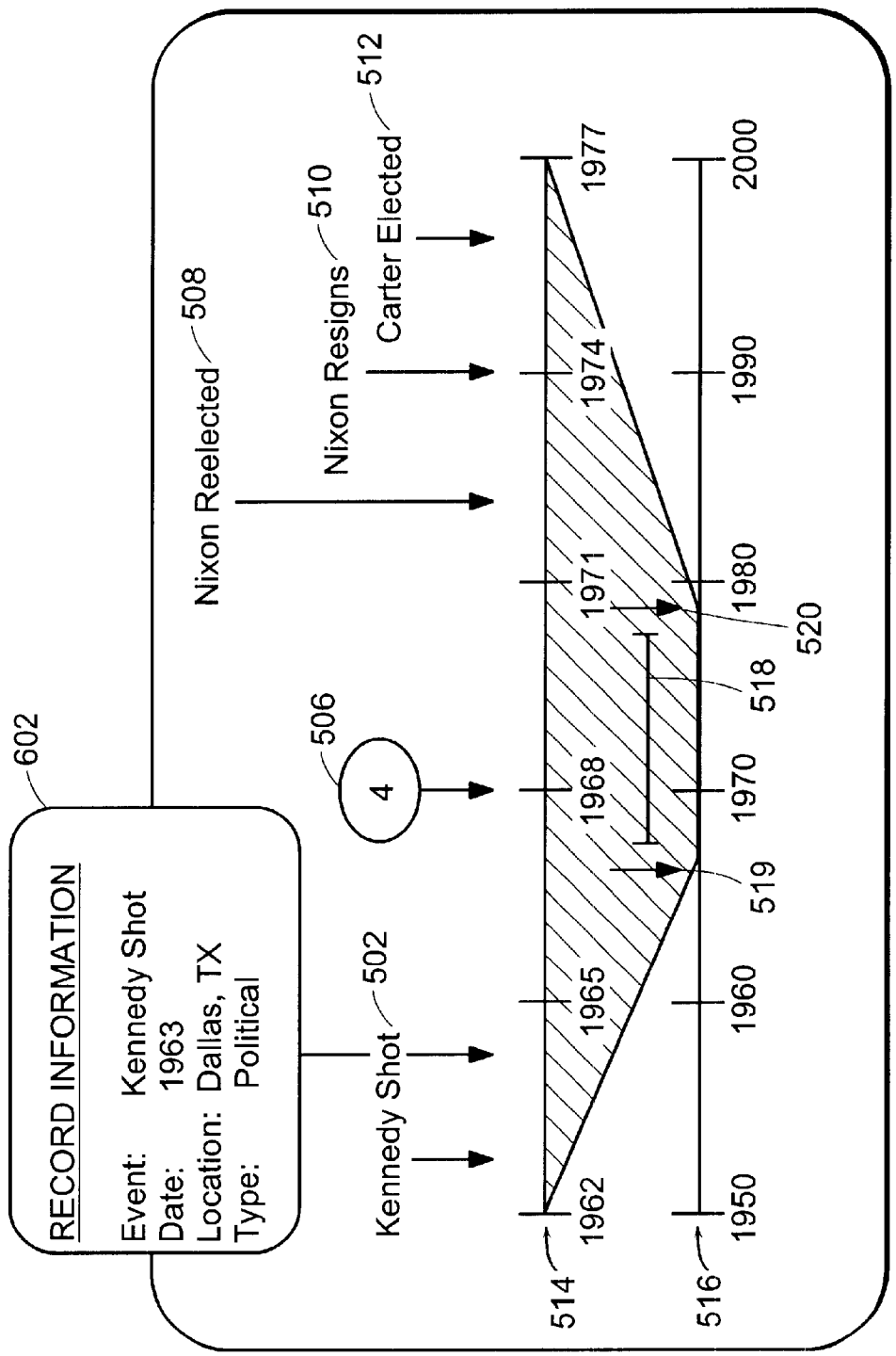
FIG. 6 is an illustration of a time line data visualization on a collection of database records with a drill-down display for a particular database record in a preferred embodiment of the present invention.

FIG. 6 is an illustration of a time line data visualization on a collection of database records with a drill-down display for a particular database record in a preferred embodiment of the present invention. FIG. 6 depicts the same data visualization as depicted in FIG.5, with the addition of full record display 602. The data visualization operation of examination provides the ability to view all the fields in a given database record. While the data visualizations do not initially display the full record display 602, this can be achieved by double clicking on a data visualization point (e.g., 502). In response, the fall record display 602 is rendered as a separate window containing all the fields of the underlying database record. Again, the database record is directly accessed and displayed without an intermediate format being required, as is the case in the prior art.

Modification of the data in the underlying database records is supported by the database visualizations in at least one of three ways. First, when a full record display 602 is open, the user can edit fields within the display window to change field data values. Second, the date associated with a particular event can be modified by dragging the data visualization point 502, 504, 506, 508, 510, 512 to a new position on the time line. Third, a new database record can be created by double clicking on the relative scale 514, this will open a full record display 602 window with all non-defaulted fields empty. The date value for the new database record can be inferred from the position of the double click on the relative scale 514.

The time line visualization is one example of a data visualization implemented using the present invention. Those of ordinary skill in the art will recognize that other visualizations are possible, and that their appearances will vary based upon the database field that the particular data visualization points are based upon.

Figure 7:
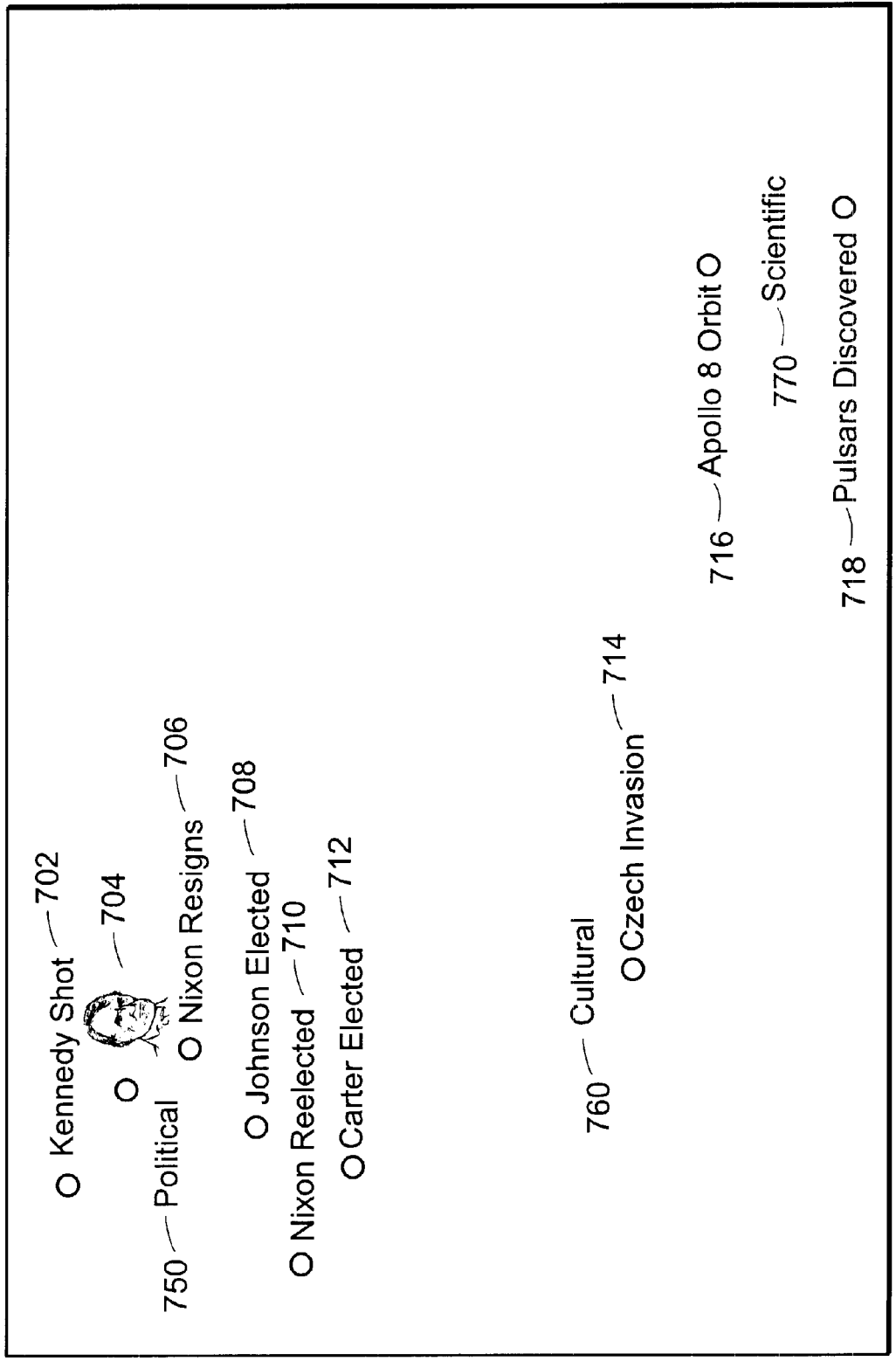
FIG. 7 is an illustration of a blank sheet data visualization on a collection of database records in a preferred embodiment of the present invention.

FIG. 7 is an illustration of a blank sheet data visualization on a collection of database records in a preferred embodiment of the present invention. The blank sheet data visualization uses spatial relationships to categorize or associate database records. The associations may be based upon a field within the database records or it may be based upon factors the user identifies as part of building the data visualization. In this example, the blank sheet data visualization shows database records categorized according to type and arranged using spatial relationships. The database records 300 associated with events 302 that are of a political type 308 are arranged around the text tag "political" 750. These include "Kennedy Shot" 702, MLK Assassination 704 "Nixon Resigns" 706, "Johnson Elected" 708, "Nixon Reelected" 710 and "Carter Elected" 712. Note that element 704, representing the assassination of Martin Luther King, Jr., is displayed as a graphic, as opposed to text. The builder of the data visualization can choose what text/graphics to associate with data visualization points, as well as where to place them within the spatial representation. For instance the user has chosen the upper-left portion of the spatial presentation for political events. The order of the data visualization points can also be determined by the user. In this case the user has chosen to group events by type, and additionally with the political type has chosen to place the three election events ( "Johnson Elected" 708, "Nixon Reelected" and "Carter Elected" 712) close together on the spatial representation.

Other database records represented by data visualization points can also be grouped by type. For example, "Czech invasion" 714 event has been placed in the lower-right portion of the spatial representation close to the cultural 760 element. Scientific 770 events "Apollo Orbit" 716 and "Pulsars Discovered" 718 have been placed in the lower-right portion of the spatial representation. Visualization points can be placed on the spatial presentation from an enumerated list generated from the database records 300 by dragging them from the list to a position in the spatial representation.

Figure 8:
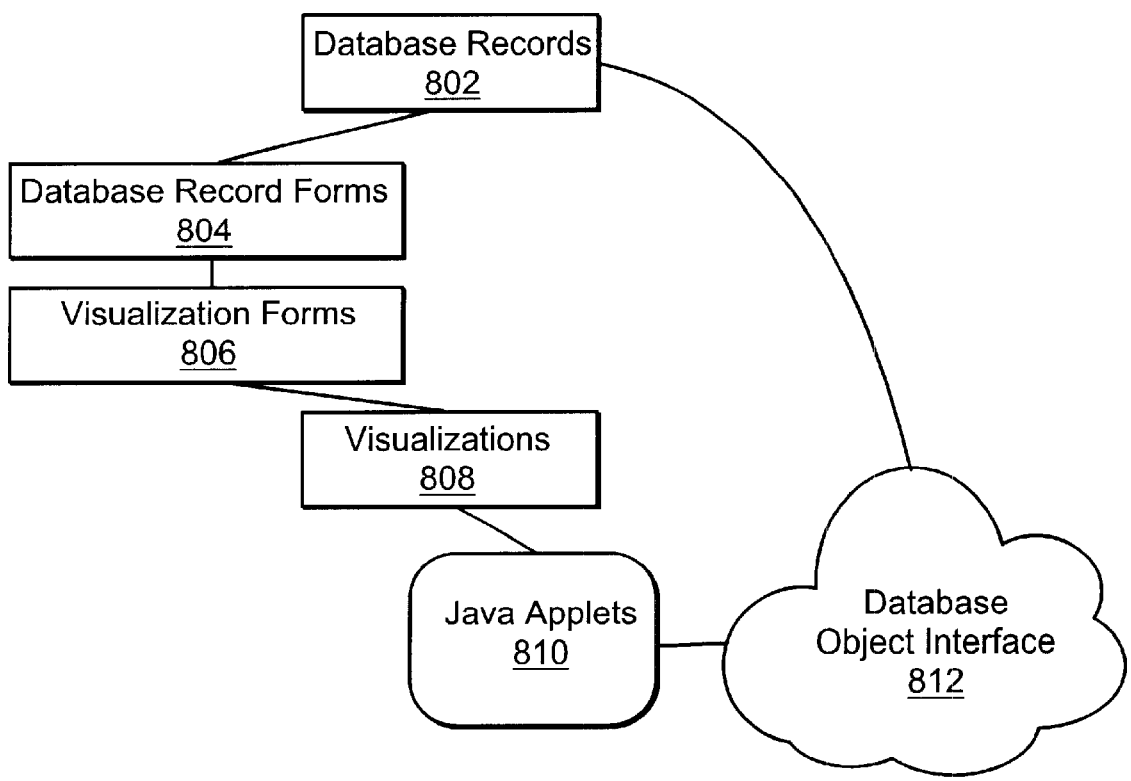
FIG. 8 is a diagram of data visualizations interacting with other database components in a preferred embodiment of the present invention.

FIG. 8 is a diagram of data visualizations interacting with other database components in a preferred embodiment of the present invention. A database system, such as Lotus Notes® R5 with the Lotus Domino™ server, provides for the storage and management of database records 802. The storage and display of the database records 802 is defined by database record forms 804. The database record forms 804 are stored as part of a particular database. Data visualizations 808 are also stored as part of a particular database and are defined by visualization forms 806. These visualizations 808 can contain Java™ applets 810. The Java™ applets 810 provide programming ability to the creator of the visualization 808, giving the creator control over which database records 802 will be included in the visualization 808, and how they will be displayed. The Java™ applets 810 access database records 802 by way of a database object interface 812. An example database object interface 812 is the Domino™ Objects for Java™ API.

Lotus Notes® uses forms for data entry, displaying data, and defining the field structure of documents (database records). When documents are opened, data is viewed using the form. A database may have a variety of forms used for displaying different data, or even for displaying the same data in different formats. The form can contain fields, static text, tables, graphics, buttons, popups, and other objects such as OLE links, ActiveX controls or Java™ applets. When a form is designed these objects are placed where they are to be displayed; formats to control how the data appears on the screen can also be selected. A form contains multiple components that define the structure of your database. These components can be fields, static text, graphics, buttons, popups, layout regions, tables, and objects (e.g., OLE, ActiveX, Java applets) that link Notes® to other products and a variety of other components.

Various components are used in the design of forms, including: fields, text, graphics, form-actions, hotspots, tables and objects.

Fields can be placed anywhere on a form. A field can be unique to that form, shared among forms within a database, or based upon a shared design template and used in multiple databases. Fields are the basis for data storage and display within Notes®. In addition to storing data, fields can be used to calculate data and attach programs (e.g., LotusScript) that run when navigation to or from certain fields occurs.

Text attributes, such as bold type or color, can be applied to fields and affect the way data is displayed in a document. Static text can be placed anywhere on a form text attributes (e.g., color, size, different typefaces) can be applied to it. Generally fields are labeled with text to help users understand the purpose of each field in a form Graphics can also be places anywhere on a form, and they will appear on every document created using the form. For example, if a correspondence form is designed, a company logo can be placed at the top of the form to create a letterhead.

Form-actions and hotspots, provide the ability to click to accomplish simple tasks that mimic the Notes® menus or complex tasks that are defined by formulas or a LotusScript program. Form-actions can be displayed on the action bar and the Actions menu. Hotspots, in the form of pop-up text, actions, links, and formulas can be placed directly on the form. Hotspots provide a useful way to automate static text and decorative graphics.

Tables are useful for summarizing information or lining up fields into rows and columns. A table placed on a form appears in every document created using that form. The cell borders (lines that surround each table cell) can be disabled to create an "invisible" table.

Objects, such as Object Linking and Embedding (OLE) objects, ActiveX controls and Java™ applets, can be placed on a form. Object enable a Notes® document to view and update data created in another product. ActiveX controls and Java™ applets can be used to implement data visualizations.

Each form created in Notes® has one of three form types associated with it. The following three types of forms can exist in a Notes® database, and they follow a hierarchical order: document, response-to-document and response-to-response. Document is the default form type and the highest-ranking form in the form hierarchy. Response-to-document and response-to-response type forms are used to create responses to documents and other responses. Notes® distinguishes between these three types of documents when building views, by indenting responses beneath their parents and by creating appropriate column formulas and attributes to enable documents to be associated correctly.

Since the data visualizations are stored with the Notes® database, all Notes® database features are inherited by the data visualization mechanism (see FIG. 1). The database, including the visualizations 808, are, in one embodiment, stored together (e.g., as one large Notes® NSF file). This unification of storage provides simplified management of all the database components. Because Notes® is a distributed architecture database, distribution of new or modified visualizations 808 is accomplished automatically as the Notes® database is replicated. The security and access control features of Notes® are also available to visualizations 808. Therefore access control lists and password protection can be attached to the visualizations 808. Another feature that is automatically inherited by visualizations 808 is automatic backup, where a copy of the visualization 808 is copied from the database to another location for safe keeping.

Since visualizations are stored as records within the database, visualizations of existing visualizations are possible, thus creating a hierarchy of visualizations. This newly created visualization hierarchy can also be stored in the database by virtue of the act that it is a visualization and thus stored as a record within the database.

An alternative to using Notes® forms and Java™ applets is to use Microsoft's ActiveX technology to create an OCX-based implementation. ActiveX is a set of technologies that enables software components to interact with one another in a networked environment, regardless of the language in which the components were created. It was developed as a proposed standard by Microsoft in the mid 1990s and is currently administered by the Open Group. It is built on Microsoft's Component Object Model (COM). Currently, ActiveX is used primarily to develop interactive content for the World Wide Web, although it can be used in desktop applications and other programs. ActiveX controls can be embedded in Web pages to produce animation and other multimedia effects, interactive objects, and sophisticated applications. ActiveX controls (e.g., OCXs) are reusable software components that incorporate ActiveX technology. These components can be used to add specialized functionality, such as animation or pop-up menus, to Web pages, desktop applications, and software development tools. ActiveX controls can be written in a variety of programming languages, including C, C++, Visual Basic, and Java. The data visualizations of the present invention can be implemented using ActiveX technology and OCXs.

Figure 9:
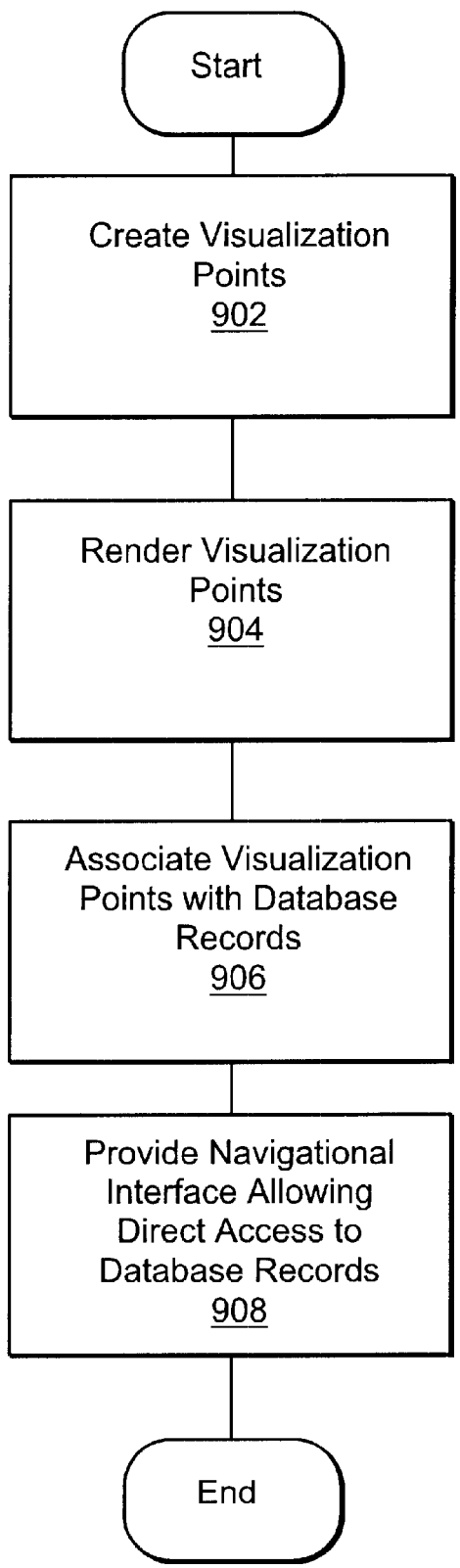
FIG. 9 is a flowchart of the steps of providing data visualizations in a preferred embodiment of the present invention.

FIG. 9 is a flowchart of the steps of providing data visualizations in a preferred embodiment of the present invention. The process starts, and at the create visualization points 902 step the visualization points are created. This process involves the mapping of data in the abstract space (i.e., database records) to positions within the presentation (concrete) space. The mapping may include a characterization of the fields in the database records as descriptive, scalar or categorical.

The step of render visualization points 904 comprises positioning visualization points within the dimensions of the presentation space. The layout of visualization points in the presentation space may be continuous or discrete. The step, associate visualization points with database records 906, associates a unique identifier of a database record with a visualization point. This allows multiple operations on the underlying database records, including drill-down to the underlying database record from the data visualization when the user request a full record display and modification of field values in the underlying database records. A step to provide navigational interface allowing direct access to database records 908 permits a user to alter the visualization points in the data visualization. New visualization points that are made part of the data visualization can provide direct access to the underlying database records. This technique of navigating through a set of database records using a data visualization provides an effective interface for data display as well as manipulation (i.e., editing of data in database record fields).

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for visualization of information stored in a database record comprising:
   creating a visualization point representing the database record;
   rendering the visualization point representing the dase record;
   associating the visulization point with an entire database record and providing a link to the entire database record;
   providing a navigational interface for processing a user interaction with the visualization point,
   wherein the navigation interface presents the visulization point along a number line representing a time link, the time line comprising:
      a first displayed scale representing a fill range of dates for the database records,
      a second displayed scale, separate from the first displayed scale, representing a subset of the first displayed range of dates for the database records associated with the visualization points; and
      a slider mechanism for adjusting the ratio of the first displayed scale representing the fill range of dates to the second displayed scale representing, a subset of the first displayed range of dates; and
   wherein the user interaction provides direct access to the entire database record.

2. The method of claim 1 wherein the direct access allows for the display of information stored in the associated database record.

3. The method of claim 2 wherein the display of information includes information generated from the information stored in the entire database record.

4. The method of claim 1 wherein the direct access allows for the updating of information stored in the associated database record.

5. The method of claim 1 wherein the database record is stored as a document in a Lotus Notes database system.

6. A system for visualization of information stored in a database record comprising:
   a means for creating a visualization point representing the database record;
   a means for rendering the visualization point representing the database record;
   a means for associating the visualization point with an entire database record and providing a link to the entire database record;
   a means for providing a navigational interface for processing a user interaction with the visualization point;
   wherein the navigational interface presents the visualization point along a number line representing a time line, the time line comprising:
      a first displayed scale representing a full range of dates for database records;
      a second displayed scale, separate from the first displayed scale, representing a subset of the first displayed range of dates for the database records associated with the visualization points; and
      a slider mechanism for adjusting the ratio of the first displayed scale representing the fall range of dates to the second displayed scale representing a subset of the first displayed range of dates; and
   wherein the user interaction provides direct access to the entire database record.

7. A computer program product comprising:
   a computer usable medium for visualization of information stored in a database record;
   a set of computer program instructions embodied on the computer usable medium, including instructions to:
      create a visualization point representing the database record;
      render the visualization point representing the database record;
      associate the visualization point with and entire database record and providing a link to the entire database record;
      provide a navigational interface for processing a user interaction with the visualization point;
      wherein the navigational interface presents the visualization point along a number line representing a time line, the time line comprising:
         a first displayed scale representing a fill range of dates for the database records;
         a second displayed scale, separate from the first displayed scale, representing a subset of the first displayed range of dates for the database records associated with the visualization points; and
         a slider mechanism for using the ratio of the first displayed scale representing the full range of dates to the second displayed scale representing a subset of the first displayed range of dates; and
   wherein the user interaction provides direct access to the entire database record.

8. A carrier wave carrying a propagated signal for visualization of information stored in a database record, the signal comprising a set of computer program instructions to:
   create a visualization point representing the database record;
   render the visualization point representing the database record;

associate the visualization point with an entire database record and provide a link to the entire database record;

provide a navigational interface for processing a user interaction with the visualization point;

wherein the navigational interface presents the visualization point along a number line representing a time line, the time line comprising:
- a first displayed scale representing a fall range of dates for the database records;
- a second displayed scale, separate from the first displayed scale, representing a subset of the first displayed range of dates for the database records associated with the visualization points; and
- a slider mechanism for adjusting the ratio of the first displayed scale representing the full range of dates to the second displayed scale representing a subset of the first displayed range of dates; and wherein the user interaction provides direct access to the entire database records.

9. A system for visualization of information stored in a database record comprising:
- an initializer creating a visualization point representing the database record;
- a renderer rendering the visulization point representing the database record;
- a mapper associating the visulization point with an entire database record and providing a link to the entire database record;
- a user interface providing a navigational interface for processing a user interaction with the visualization point;

wherein the navigational interface presents the visualization point along a number line representing a time line, the time line comprising:
- a first displayed scale representing a fill range of dates for the database records;
- a second splayed scale, separate from the first displayed scale, representing a subset of the first displayed range of dates for the database records associated with the visualization points; and
- a slider mechanism for adjusting the ratio of the first displayed scale representing the full range of dates to the second displayed scale representing a subset of the first displayed range of dates; and wherein the user interaction provides direct access to the entire database record.

10. The system of claim 9 wherein the direct access allow for the display of information stored in the associated record.

11. The system of claim 10 wherein the display of information includes information generated from the information stored in the entire database records.

12. The system of claim 9 wherein the direct access allows for the updating of information stored in the associated database record.

* * * * *

UNITED STATES PATENT AND TRADEMARK OFFICE
CERTIFICATE OF CORRECTION

PATENT NO.     : 6,529,900 B1
DATED          : March 4, 2003
INVENTOR(S)    : John F. Patterson, Steven L. Rohall and Arjuna Wijeyekoon It is certified that error appears in the above-identified patent and that said Letters Patent is hereby corrected as shown below:

Column 11,
Lines 39 and 44, delete "visulization" and insert -- visualization --;
Line 45, delete "link" and insert -- line --;
Lines 47 and 43, delete "fill" and insert -- full --.

Column 12,
Line 24, delete "fall" and insert -- full --;
Line 47, delete "fill" and insert -- full --;
Line 54, delete "using" and insert -- adjusting --.

Column 13,
Line 8, delete "fall" and insert -- full --;
Lines 25 and 27, delete "visulization" and insert -- visualization --.

Column 14,
Line 8, delete "fill" and insert -- full --;
Line 10, delete "splayed" and insert -- displayed --;
Line 20, delete "allow" and insert -- allows --.

Signed and Sealed this

Eighth Day of April, 2003

JAMES E. ROGAN
*Director of the United States Patent and Trademark Office*